(12) United States Patent
Foley et al.

(10) Patent No.: US 9,064,256 B2
(45) Date of Patent: Jun. 23, 2015

(54) PRODUCTS AND PROCESSES FOR UTILIZING ORDER DATA AND RELATED DATA

(75) Inventors: Kevin Foley, New York, NY (US); John Silvestri, New York, NY (US)

(73) Assignee: CFPH, LLC, New York, NY (US)

( * ) Notice: Subject to any disclaimer, the term of this patent is extended or adjusted under 35 U.S.C. 154(b) by 1560 days.

(21) Appl. No.: 12/300,766

(22) PCT Filed: May 14, 2007

(86) PCT No.: PCT/US2007/068900
§ 371 (c)(1),
(2), (4) Date: Jul. 15, 2009

(87) PCT Pub. No.: WO2007/134299
PCT Pub. Date: Nov. 22, 2007

(65) Prior Publication Data
US 2009/0313169 A1   Dec. 17, 2009

Related U.S. Application Data

(60) Provisional application No. 60/825,504, filed on Sep. 13, 2006, provisional application No. 60/820,053, filed on Jul. 21, 2006, provisional application No. 60/799,897, filed on May 13, 2006.

(51) Int. Cl.
*G06Q 20/00* (2012.01)
*G06Q 20/40* (2012.01)
*G06Q 30/06* (2012.01)
*G06Q 40/04* (2012.01)
*G06F 21/62* (2013.01)

(52) U.S. Cl.
CPC .......... *G06Q 20/405* (2013.01); *G06F 21/6245* (2013.01); *G06Q 30/06* (2013.01); *G06Q 40/04* (2013.01)

(58) Field of Classification Search
USPC .......................................................... 705/64
See application file for complete search history.

(56) References Cited

U.S. PATENT DOCUMENTS

| | | | |
|---|---|---|---|
| 5,126,936 A | 6/1992 | Champion et al. | |
| 5,799,287 A | 8/1998 | Dembo | |
| 5,924,082 A | 7/1999 | Silverman et al. | |
| 6,012,046 A * | 1/2000 | Lupien et al. | 705/36 R |
| 6,408,282 B1 | 6/2002 | Buist | |
| 6,938,010 B1 | 8/2005 | Everson et al. | |
| 6,952,683 B1 | 10/2005 | Gerhard | |
| 7,076,461 B2 | 7/2006 | Balabon | |
| 7,136,834 B1 | 11/2006 | Merrin et al. | |
| 7,155,409 B1 | 12/2006 | Stroh | |
| 7,308,428 B1 | 12/2007 | Federspiel | |
| 7,356,500 B1 | 4/2008 | Waelbroeck et al. | |
| 7,418,416 B2 | 8/2008 | Guidi et al. | |
| 7,428,506 B2 | 9/2008 | Waelbroeck et al. | |
| 7,475,046 B1 | 1/2009 | Foley et al. | |
| 7,565,313 B2 | 7/2009 | Waelbroeck et al. | |
| 7,680,715 B2 | 3/2010 | Waelbroeck et al. | |
| 7,685,052 B2 | 3/2010 | Waelbroeck et al. | |
| 7,689,495 B1 | 3/2010 | Kim et al. | |
| 7,747,515 B1 | 6/2010 | Merrin et al. | |
| 7,778,919 B2 | 8/2010 | Waelbroeck et al. | |
| 7,814,000 B2 | 10/2010 | Waelbroeck et al. | |
| 7,827,085 B1 | 11/2010 | Hochenberger et al. | |
| 7,831,501 B2 | 11/2010 | Schlifstein et al. | |
| 7,865,425 B2 | 1/2011 | Waelbroeck et al. | |
| 7,877,318 B2 | 1/2011 | Waelbroeck et al. | |
| 7,882,015 B2 | 2/2011 | Waelbroeck et al. | |
| 7,908,205 B2 | 3/2011 | Waelbroeck et al. | |
| 7,908,206 B2 | 3/2011 | Waelbroeck et al. | |
| 7,917,425 B2 | 3/2011 | Waelbroeck et al. | |
| 7,996,261 B1 | 8/2011 | Waelbroeck et al. | |
| 8,010,438 B2 | 8/2011 | Waelbroeck et al. | |
| 8,041,628 B2 | 10/2011 | Waelbroeck et al. | |
| 8,069,106 B2 | 11/2011 | Waelbroeck et al. | |
| 8,073,763 B1 | 12/2011 | Merrin et al. | |
| 8,082,205 B2 | 12/2011 | Lutnick et al. | |
| 8,095,456 B2 | 1/2012 | Waelbroeck et al. | |
| 8,103,579 B1 | 1/2012 | Berkeley, III | |
| 8,165,954 B2 | 4/2012 | Waelbroeck et al. | |

(Continued)

FOREIGN PATENT DOCUMENTS

| | | |
|---|---|---|
| CA | 2624097 | 9/2006 |
| EP | 2220846 | 10/2012 |

(Continued)

OTHER PUBLICATIONS

PCT Search Report and Written Opinion for PCT/US07/68900; 6 pages; Jan. 29, 2008.

(Continued)

*Primary Examiner* — Zeshan Qayyum

(57) ABSTRACT

In an embodiment, an apparatus comprises a processor, and a memory that stores a program. The program, when executed by the processor, directs the processor to perform a method including the following steps: receiving an encrypted query, in which the query indicates at least one security, and at least one price; determining whether the encrypted query corresponds to any order in an encrypted data set that represents orders; outputting a response to the query, in which the response indicates whether the encrypted query corresponds to any order in an encrypted data set that represents orders; receiving order data that represents the orders; and encrypting the order data to yield the encrypted data set that represents orders.

12 Claims, No Drawings

(56) References Cited

U.S. PATENT DOCUMENTS

| | | | |
|---|---|---|---|
| 8,266,045 B2 | 9/2012 | Waelbroeck et al. | |
| 8,285,629 B2 | 10/2012 | Lutnick et al. | |
| 8,306,904 B1 | 11/2012 | Marchini | |
| 8,311,920 B2 | 11/2012 | Lutnick et al. | |
| 8,321,323 B2 | 11/2012 | Lutnick et al. | |
| 8,447,649 B1 | 5/2013 | Waelbroeck et al. | |
| 8,484,121 B2 | 7/2013 | Balabon | |
| 8,751,362 B1 | 6/2014 | Lutnick et al. | |
| 2001/0050990 A1 | 12/2001 | Sudia | |
| 2002/0032668 A1* | 3/2002 | Kohler et al. | 705/401 |
| 2002/0052827 A1 | 5/2002 | Waelbroeck et al. | |
| 2002/0099642 A1 | 7/2002 | Schwankl et al. | |
| 2002/0104002 A1 | 8/2002 | Nishizawa et al. | |
| 2003/0004859 A1 | 1/2003 | Shaw et al. | |
| 2003/0009427 A1 | 1/2003 | Pan | |
| 2003/0182214 A1 | 9/2003 | Taylor | |
| 2003/0182224 A1 | 9/2003 | Horrigan et al. | |
| 2004/0034591 A1 | 2/2004 | Waelbroeck et al. | |
| 2004/0059666 A1 | 3/2004 | Waelbroeck et al. | |
| 2004/0133495 A1 | 7/2004 | Bosch et al. | |
| 2004/0177023 A1 | 9/2004 | Krowas et al. | |
| 2004/0210511 A1 | 10/2004 | Waelbroeck et al. | |
| 2005/0075963 A1 | 4/2005 | Balabon | |
| 2005/0149428 A1 | 7/2005 | Gooch et al. | |
| 2005/0166046 A1* | 7/2005 | Bellovin et al. | 713/165 |
| 2005/0187866 A1 | 8/2005 | Lee | |
| 2005/0273421 A1 | 12/2005 | Rosenthal et al. | |
| 2006/0026090 A1 | 2/2006 | Balabon | |
| 2006/0031156 A1 | 2/2006 | Noviello et al. | |
| 2006/0129477 A1 | 6/2006 | Goodwin et al. | |
| 2006/0136318 A1 | 6/2006 | Rafieyan et al. | |
| 2006/0136326 A1 | 6/2006 | Heckman et al. | |
| 2006/0143099 A1 | 6/2006 | Partlow et al. | |
| 2006/0259394 A1 | 11/2006 | Cushing et al. | |
| 2007/0005484 A1 | 1/2007 | Waelbroeck et al. | |
| 2007/0005488 A1 | 1/2007 | Keith | |
| 2007/0038548 A1 | 2/2007 | Schlifstein et al. | |
| 2007/0055607 A1 | 3/2007 | Wunsch et al. | |
| 2007/0083452 A1 | 4/2007 | Mayle et al. | |
| 2007/0124228 A1 | 5/2007 | Elias et al. | |
| 2007/0150405 A1 | 6/2007 | Greenberg et al. | |
| 2007/0192227 A1* | 8/2007 | Fitzpatrick et al. | 705/36 R |
| 2007/0244790 A1 | 10/2007 | Olsson et al. | |
| 2007/0244792 A1 | 10/2007 | Couperier | |
| 2007/0288342 A1 | 12/2007 | Maclin et al. | |
| 2008/0021803 A1 | 1/2008 | Ahles et al. | |
| 2008/0027847 A1 | 1/2008 | Masucci | |
| 2008/0033867 A1 | 2/2008 | Hirani et al. | |
| 2008/0040257 A1 | 2/2008 | Nafeh et al. | |
| 2008/0262957 A1 | 10/2008 | Ford | |
| 2008/0294544 A1 | 11/2008 | Harrington et al. | |
| 2009/0018945 A1 | 1/2009 | Ford | |
| 2009/0094151 A1 | 4/2009 | Mortimer | |
| 2009/0204535 A1 | 8/2009 | Lutnick et al. | |
| 2009/0259584 A1 | 10/2009 | Waelbroeck et al. | |
| 2009/0307121 A1 | 12/2009 | Lutnick et al. | |
| 2009/0319417 A1 | 12/2009 | Littlewood | |
| 2010/0057626 A1 | 3/2010 | Lutnick et al. | |
| 2010/0057627 A1 | 3/2010 | Lutnick et al. | |
| 2010/0076883 A1 | 3/2010 | Lutnick et al. | |
| 2010/0076884 A1 | 3/2010 | Lutnick et al. | |
| 2010/0076896 A1 | 3/2010 | Lutnick et al. | |
| 2010/0082495 A1 | 4/2010 | Lutnick et al. | |
| 2010/0082500 A1 | 4/2010 | Lutnick et al. | |
| 2010/0121759 A1 | 5/2010 | Waelbroeck et al. | |
| 2010/0153304 A1 | 6/2010 | Waelbroeck et al. | |
| 2010/0191637 A1 | 7/2010 | Alderucci et al. | |
| 2010/0191638 A1 | 7/2010 | Alderucci et al. | |
| 2010/0332368 A1 | 12/2010 | Alderucci et al. | |
| 2011/0137785 A1 | 6/2011 | Lutnick et al. | |
| 2011/0137786 A1 | 6/2011 | Lutnick et al. | |
| 2012/0095901 A1 | 4/2012 | Berkeley, III | |
| 2013/0097065 A1 | 4/2013 | Lutnick et al. | |
| 2013/0218727 A1 | 8/2013 | Lutnick et al. | |
| 2015/0026029 A1 | 1/2015 | Lutnick et al. | |

FOREIGN PATENT DOCUMENTS

| | | |
|---|---|---|
| JP | H10-504409 | 4/1998 |
| JP | 2001-229302 | 8/2001 |
| JP | 2002-297606 | 10/2002 |
| JP | 2004-127113 | 4/2004 |
| JP | 2005-228029 | 8/2005 |
| JP | 2008-518362 | 5/2008 |
| JP | 2009-534744 | 9/2009 |
| JP | 2001-319064 | 11/2011 |
| WO | WO 96/05563 | 2/1996 |
| WO | WO 2006/047712 | 5/2006 |
| WO | WO 2007/041220 | 4/2007 |
| WO | WO 2007/127041 | 11/2007 |

OTHER PUBLICATIONS

Examiners Report for AU Application No. 2007149195; Dec. 15, 2009 ; 12 pages.
PCT Search Report and Written Opinion for PCT/US08/83618; Apr. 22, 2009 ; 12 pages.
PCT Search Report and Written Opinion for PCT/US08/83571; Mar. 26, 2009; 15 pages.
U.S. Appl. No. 12/015,990, filed Jan. 17, 2009; 80 Pages.
U.S. Appl. No. 12/271,027, filed Nov. 14, 2008; 73 Pages.
U.S. Appl. No. 12/470,431, filed May 21, 2008; 92 Pages.
U.S. Appl. No. 12/477,523, filed Jun. 3, 2009; 92 Pages.
U.S. Appl. No. 12/477,549, filed Jun. 3, 2009; 92 Pages.
U.S. Appl. No. 12/237,941, filed Sep. 25, 2008; 185 Pages.
U.S. Appl. No. 12/204,403, filed Sep. 4, 2008; 170 Pages.
U.S. Appl. No. 12/237,958, filed Sep. 25, 2008; 176 Pages.
U.S. Appl. No. 12/237,976, filed Sep. 25, 2008; 177 Pages.
U.S. Appl. No. 12/204,341, filed Sep. 4, 2008; 163 Pages.
U.S. Appl. No. 12/135,479, filed Jun. 9, 2008; 75 Pages.
U.S. Appl. No. 12/239,803, filed Sep. 28, 2008; 114 Pages.
U.S. Appl. No. 12/239,804, filed Sep. 28, 2008; 114 Pages.
U.S. Appl. No. 12/257,499, filed Oct. 24, 2008; 169 Pages.
U.S. Appl. No. 12/358,753, filed Jan. 23, 2009; 163 Pages.
U.S. Appl. No. 12/358,768, filed Jan. 23, 2009; 165 Pages.
U.S. Appl. No. 12/494,439, filed Jun. 30, 2009; 169 Pages.
U.S. Appl. No. 12/631,181, filed Dec. 4, 2009; 169 Pages.
U.S. Appl. No. 12/631,208, filed Dec. 4, 2009; 167 Pages.
U.S. PTO Office Action for U.S. Appl. No. 12/015,990; Apr. 27, 2010; 11 pages.
Notice of Acceptance for AU Application No. 2007249195; Apr. 7, 2010; 6 pages.
PCT International Search Report and Written Opinion for Application No. PCT/US10/21986 filed Jan. 25, 2010; 8 pages.
Schmerken, Ivy; "Credit Suisse Introduces Block Algos to Tap Liquidity in CrossFinder ATS and Other Venues Simultaneously"; Advanced Trading; Mar. 18, 2010; 2 pages.
Harris, Larry ; "Trading & Exchanges, Market Microstructure for Practitioners", 2003; 7 pages.
"Official Launch of New York Block exchange announced"; Automated Trading News; Jan. 30, 2009; 1 page.
US PTO Office Action for U.S. Appl. No. 12/204,341 dated Oct. 26, 2010; 31 pages.
U.S. Appl. No. 60/820,053, filed Jul. 21, 2006; 28 pages.
U.S. Appl. No. 60/825,504, filed Sep. 13, 2006; 28 pages.
U.S. Appl. No. 60/799,897, filed May 13, 2006; 24 pages.
U.S. Appl. No. 60/988,010, filed Nov. 14, 2007; 67 pages.
U.S. Appl. No. 60/988,426, filed Nov. 15, 2007; 177 pages.
U.S. Appl. No. 61/306,516, filed Feb. 21, 2010; 172 pages.
U.S. Appl. No. 12/494,438 dated Apr. 1, 2011; 12 pages.
AU Examination Report for AU Application No. 200832249 dated Mar. 4, 2011; 2 pages.
U.S. PTO Office Action for U.S. Appl. No. 12/015,990; Jan. 3, 2011; 3 pages.
AU Examination Report for AU Application No. 2008322557 dated Mar. 4, 2011; 2 pages.
AU Examiners Report for Application No. 2006204096 dated May 3, 2011; 2 pages.
U.S. PTO Office Action for U.S. Appl. No. 12/271,027; 15 pages; Nov. 17, 2011.

(56) References Cited

OTHER PUBLICATIONS

JP Office Action for Application No. 2009-511195; Apr. 10, 2012; 4 pages (including English Translation).
CA Office Action for Application No. 2652285; Mar. 30, 2012; 3 pages.
Notice of Allowance for U.S. Appl. No. 12/015,990; 12 pages; May 11, 2012.
U.S. PTO Office Action for U.S. Appl. No. 12/271,027; 11 pages; Jun. 5, 2012.
AU Notice of Acceptance for Application No. 2010202272 dated Dec. 1, 2012; 2 pages.
JP Office Action for Application No. 2010-534209, 4 pages; Apr. 23, 2013 (w/English translation).
EP Extended Search Report for Application No. 08849948.8, 5 pages; Apr. 25, 2012.
Statement in accordance with Notice from EPO dated Oct. 1, 2007.
EP Extended Search Report for Application No. 08848638.6, 5 pages; Apr. 25, 2012.
JP Notice of Allowance for Application No. 2009-511195, 4 pages; Jan. 30, 2013 (w/English translation).
CA Examiner's Requisition for Application No. 2,705,945, 2 pages; Jan. 18, 2013.
U.S. Notice of Allowance for U.S. Appl. No. 12/113,602; Aug. 19, 2011; 14 pages.
U.S. PTO Office Action for U.S. Appl. No. 13/613,862; 18 pages; Mar. 4, 2013.
U.S. PTO Office Action for U.S. Appl. No. 13/614,758; 18 pages; Aug. 16, 2013.
U.S. PTO Office Action for U.S. Appl. No. 12/271,027; 12 pages; Jul. 22, 2013.
JP Office Action for Application No. 2013-041263, 7 pages; Dec. 3, 2013 (w/English translation).
U.S. PTO Office Action for U.S. Appl. No. 13/613,862; 18 pages; Oct. 17, 2013.
JP Office Action for Application No. 2010-534209, 4 pages; Oct. 15, 2013 (w/English translation).
U.S. PTO Notice of Allowance for U.S. Appl. No. 12/271,027; 7 pages; Feb. 19, 2014.
U.S. PTO Final Office Action for U.S. Appl. No. 13/614,758; 23 pages; Apr. 30, 2014.
CA Examiner's Requisition for App. No. 2,705,945; Jan. 23, 2014; 4 pages.
CA Examiner's Requisition for App. No. 2,652,285; Apr. 15, 2014; 3 pages.
U.S. PTO Final Office Action for U.S. Appl. No. 13/613,862; 23 pages; Jun. 19, 2014.
JP Final Decision for Application No. 2010-534209, 10 pages; Mar. 18, 2014 (w/English translation).
AU Examination Report for App. No. 2012261679; Oct. 3, 2014; 3 pages.
AU Examination Report for App. No. 2012244193; Sep. 4, 2014; 3 pages.
AU Examination Report for App. No. 2012258334; Aug. 18, 2014; 3 pages.
CA Examination Requisition for App. No. 2705940; Jun. 20, 2014; 6 pages.
CA Examiner's Requisition for Application No. 2,705,940, 2 pages; Jun. 11, 2013.
JP Reason for Refusal for App. No. 2013-041263; Nov. 25, 2014; 6 pages (w/English translation).

* cited by examiner

PRODUCTS AND PROCESSES FOR UTILIZING ORDER DATA AND RELATED DATA

This application claims the benefit of priority of the following U.S. patent applications:

U.S. Patent Application No. 60/799,897, filed May 13, 2006, entitled "PRODUCTS AND PROCESSES FOR UTILIZING ORDER DATA AND RELATED DATA";

U.S. Patent Application No. 60/820,053, filed Aug. 24, 2006, entitled "PRODUCTS AND PROCESSES FOR UTILIZING ORDER DATA AND RELATED DATA";

U.S. Patent Application No. 60/825,504, filed Sep. 13, 2006, entitled "PRODUCTS AND PROCESSES FOR UTILIZING ORDER DATA AND RELATED DATA";

The entirety of each of the above applications is incorporated by reference herein.

BACKGROUND

Economic activity has at its centerpiece the buyer/seller transaction for all goods and services produced and consumed in the market economy. The buyer/seller transaction is the fundamental mechanism that allocates resources to producers and output to consumers. The value of goods and services is usually expressed in a currency of denomination such as U.S. dollars. This mechanism transcends national borders. Because trade in goods and services flourishes across international borders, there is also a need to obtain foreign currency and hence create markets where currency itself is traded and is governed by the laws of supply and demand.

Throughout history, there have been many different approaches adopted to bringing buyers and sellers of goods, services, and currency together, each with the key objective of permitting transactions at or as close as possible to the "market" price of the tradable item satisfying the desires of both buyers and sellers. By definition, the market price is the price in given currency terms that a fully educated market, given full access, will transact select goods services, and currency. Discovery of the market price can only be accomplished by permitting full access to the transaction by essentially all potential buyers and sellers and by allowing expression of each party's desires. However, the buyer/seller transaction must be structured to operate at very low costs or it will distort the market price of the tradable items with artificially high transaction costs. Thus, as can be seen, the two keys to effective buyer/seller transactions—full access of expression and knowledge coupled with low transaction costs—can be and are often conflicting, necessitating trade-offs between trading efficiency and market knowledge.

Today, electronic matching and dealing systems have found successful application in many trading activities, including the buying and selling of a variety of items including goods, services, and currency. Many of these trading activities focus on the buying and selling of essentially fungible items, that is, items that are without meaningful differentiation from like items on the market. For example, a sum of currency to be deliverable on a certain date, e.g., 62,500 British Pounds Sterling at a price of 1.65 United States Dollars per 1 British Pound Sterling is indistinguishable from the same sum of currency owned by another investor on that same date.

However, these electronic matching and dealing systems have not significantly impacted various goals of various parties in such markets.

It is, therefore, an object of the present invention to provide systems and methods for implementing improved trading systems.

This and other objects of the invention are realized in a data processing system having control logic for managing select trading functions and/or having access to select data representing orders, indications of interest, and other data related to a trade or like transaction.

SUMMARY OF CERTAIN EMBODIMENTS

According to certain embodiments, a system permits data (e.g., order data) to be analyzed (e.g., queried) without permitting complete access to that data. In an embodiment, such data includes data regarding orders that an entity desires to make. Queries on that data include queries that determine a potential matching order between entities.

DETAILED DESCRIPTION

The sections I-VII below provide guidelines to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms means "that is", and thus limits the term or phrase it explains. For example, in the sentence "the computer sends data (i.e., instructions) over the Internet", the term "i.e." explains that "instructions" are the "data" that the computer sends over the Internet.

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

V. COMPUTING

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VII. 35 U.S.C. §112, PARAGRAPH 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

VIII. SELL SIDE DATA

Generally

Various embodiments of the present invention can be employed to work with systems for trading any types of goods, services, and assets, including financial instruments, securities (e.g., equity securities), foreign currencies, commodities, and their respective derivatives. Therefore, the description below refers to equities in a nonlimiting sense.

In various markets, there are "sell side" participants and "buy side" participants. Sell side participants include brokers who are licensed to buy and sell particular financial instruments. Buy side participants include mutual funds, hedge funds, and other entities which are not brokers.

According to various embodiments, information from both buy side participants and sell side participants can be received, stored and utilized to facilitate transactions among various parties. In one embodiment, information from sell side participants is collected and utilized in various manners. For example, information from sell side participants may be selectively processed to yield an alert (e.g., a notification to a buy side participant that a particular type of order exists with a sell side participant, other communication or information of potential interest). In another embodiment, information from sell side participants may be selectively processed to automatically execute a trade (e.g., with a buy side participant). In another embodiment, information from sell side participants may be selectively processed to initiate a communication between a sell side participant and a buy side participant that has defined an interest in such information.

According to various embodiments, various systems can be employed to collect data from entities (e.g., from sell side participants). Such data can then be processed in various manners to facilitate communication and/or a financial transaction (e.g., a trade) between entities. For example, various entities (e.g., a buy side participant) can specify data that, when made available by another entity (e.g., a sell side participant), triggers an action (e.g., providing an alert to the buy side participant, initiating or helping to initiate a communication between the buy side participant and the sell side participant). Order data can include, e.g., an identifier of the financial instrument (e.g., the name or ticker symbol of an equity security), a quantity (e.g., a number of shares of the financial instrument), whether to buy or sell the financial instrument, and a price (e.g., the price for a share of the financial instrument). Order data can define a set of values or range of values (e.g., a range of prices). As used herein, a reference to a value can refer to a range of values. For example, a price can refer to a range, e.g., defined by a minimum price and a maximum price, or defined by a minimum price, or defined by a maximum price.

Order data can indicate data by reference to other data. For example, an order can specify a price that is calculated or otherwise determined by from other prices (e.g., the midpoint of two other prices such as the two prices defining the inside market). An order can represent a set of orders (e.g., a group of different securities).

Data received from entities can represent various types of information and such information may be of interest to various parties. For example, the data received from a sell side participant (or other entity) can include data that represents an offer to buy a financial instrument (e.g., a security) or an offer to sell a financial instrument. Additionally or alternatively, the data received from a sell side participant (or other entity) can include data that represents an indication of interest in a financial instrument. Additionally or alternatively, the data received from a sell side participant (or other entity) can include data representing a quotation. An order, as contrasted with a quotation, can have legal, binding effect under the proper circumstances, while a quotation is a price that an entity quotes the market. Further, historical data, such as past offers and/or past trades, may also be received from a sell side participant, or from another entity which has access to such data (e.g., an entity which records trades that have been made). As used herein, the term "order" includes quotations and other indications of prices of financial instruments.

As disclosed herein, data from various entities may be received by a server and/or other device which communicates with the various entities (e.g., with buy side participants and sell side participants).

One or more objective rules may be used in determining whether an entity (e.g., a sell side participant) can indicate as its status as a buyer or seller of a security. Such rules may use data such as: (i) actual orders the entity is currently working, (ii) the percentage of (average) daily volume (quantity) recently traded (e.g., within the previous two days), (iii) the percentage of total volume recently traded, (iv) the volume traded by another customer, and/or (v) any objective information provided by an entity regarding what the entity is willing to trade today.

The server may be owned, controlled or operated by a neutral entity besides any of the entities which participate (e.g., besides any of the sell side participants or buy side participants).

The server can collect various types of information (e.g., order data) from sell side participants through various means. In an embodiment, information from a participant is received via a device that the entity already uses or could readily use to receive such information, such as an order management system (OMS) the entity uses (e.g., the Nyfix system) or other system, such as the Autex system or other system which generally broadcasts information (e.g., to the "street"). A participant can select which information is made available. For example, certain orders in an OMS can be "blocked" such that they are not made available to the server. Similarly, certain orders in an OMS can be made available to the server. For example, orders and other data from an entity may be blocked or made available based on various criteria, e.g., size (quantity) of the order, a rating of the entity, and/or anything that may be specified (e.g., by rules). Similarly, particular orders may be blocked or made available, and other data from an entity may be blocked or made available.

In addition or alternatively, a different application or system (e.g., a web/HTML interface which is accessible via a browser) may be used to collect such information and/or make such information available to the server. For example, a Web interface may be used to receive data that defines an order. The interface can be operable to send such data, directly or indirectly, to other entities (e.g., via transmission to a central system that itself communicates with various entities).

The entity can selectively permit the server access to its information. For example, an entity (e.g., a buy side participant) may block information from being visible to the server (either automatically in accordance with specified rules, and/or manually upon command by a user).

Such information can be collected, directly or indirectly, from various entities (e.g., from sell side entities). Such information can be collected even if such information has not been made public (e.g., not released "to the market"), has not been disseminated to other entities or has not been made available to other entities. It should be noted that, in various embodiments, data which is not generally available (e.g., order data stored in an OMS) may be made available subsequently and/or may be made available to a number of entities (e.g., various traders that work for the same buy side participant).

According to various embodiments, an existing application or system of an entity, may, but need not, be used to collect such information and/or make such information available to the server.

According to various embodiments, advantages may be realized from accessing information which is generally unavailable. Specifically, there can be various advantages from accessing order data and other information that resides with buy side entities and/or sell side entities (e.g., obtaining information directly from the OMS of an entity without that information having been disseminated to the market). Such advantages will be apparent to one of ordinary skill in the art.

The data processing system according to various embodiments employs a plurality of workstations (e.g., workstations of buy side participants and/or sell side participants) that are linked with a server for coordinated data flow and processing. Communication may be provided by a computer network, such as an Ethernet, a token ring, a token bus, and/or any other suitable network configuration. The system can include a dedicated keypad for input from each workstation to facilitate providing individually programmed keystroke commands. Other devices, such as other keyboards, input keypads, or voice controlled electronic devices can be used in the present system.

Central processing logic dictates the available order, trading and allocation options, and screen displays for each workstation. The screen displays for each workstation can also be controlled using logic in or connected to the workstation. As orders and transactions are entered in this system, various protocols effect the allocation of, e.g., bid/offer control, priority generation, exclusive trading time, and trade management. As trades are completed, the system updates a linked database with the newly entered transactional data.

The communication among entities (e.g., among buy side participants and sell side participants) can be controlled by one or more servers or equivalent computing devices. A server may comprise any suitable computer or server, such as a network or Internet server. A server may be connected to one or more workstations by one or more networks. Such networks can include any of various communication devices, links, remote servers and/or nodes. Networks may include any suitable computer network such as the Internet. Similarly, communication devices, links, remote servers, and networks may include any suitable components of a computer network for enabling workstations to communicate with a server. Many other network configurations may be employed as well.

IX. SELL SIDE DATA

Distributed and Other Configurations

In an embodiment, data can be centralized or partially centralized. For example, data that represents the orders (e.g., order data), or other data from a plurality of entities, can be stored by the same device, such as a server. In another example, all or substantially all of the data that represents the orders (e.g., order data), or other data from a plurality of entities, can be stored by each of a plurality of devices.

In an embodiment, data can be distributed. For example, each of a plurality of entities can employ a server (or another device) which stores data that represents the orders (e.g., order data) or other data from that respective entity (e.g., potential orders that may be of interest, which may be specified by a user). For example, each of a plurality of servers (or other devices) may store only those orders of a respective entity (e.g., a respective buy-side participant). The data from such a plurality of servers may be made available to in various manners, such as (1) each such server communicating with one or more "central" servers which aggregate and/or process such data, and/or (2) each such server communicating with some or all other such servers in any appropriate peer-to-peer configuration.

In such an embodiment, the server which stores order data of an entity may (1) be accessible via (and possibly only via) the network (e.g., LAN) of that entity, (2) be physically controlled by the entity, and/or (3) in communication with a device (e.g., an OMS of the entity) which generates or otherwise provides the server (possibly exclusively) with order data of the entity. Some of the order data may be obtained automatically (e.g., translated/encrypted from another server) and/or entered by a user (e.g., a user enters potential orders that may be of interest).

The data that is stored by a server may be stored in various forms. For example, such data can be stored in standard format (whether such standard currently exists or is subsequently developed or established). Data may be stored in any of a plurality of different formats, and yet be translatable (by the device that stores that data or by another device) to a common format. In an embodiment, each of a plurality of servers stores data in the same format.

Data may be encrypted or otherwise stored in a format which renders extracting certain information or any information difficult or computationally intractable. For example, data may be encrypted according to an asymmetric key algorithm, such as public key encryption methodology. In an embodiment which employs public key encryption, access (e.g., the ability to easily decrypt data) data can be selectively granted by selectively granting a public key.

In an embodiment, each of a plurality of servers stores data in the same format. Each such server may employ a different encryption key than the other servers. Alternatively, the certain servers may employ the same encryption key.

In an embodiment in which data is encrypted (whether or not such data is distributed), the ability to access information on a server may include (1) the ability to decrypt all information on the server, (2) the ability to decrypt certain information (e.g., only information which is selected by the entity which controls the information), (3) the ability to answer queries related to encrypted information without necessarily providing the information in decrypted form.

As an example of answering queries related to the information without necessarily providing the information in decrypted form, a query may be (1) provided to a server which stores encrypted information, (2) interpreted by software on that server, (3) answered by the server with a binary answer (e.g., an answer which may be either "YES" or "NO"). In such an embodiment, it can be advantageous to limit the types of queries that may be asked, and/or limit the frequency with which queries (or related queries) may be asked, of the same server or of a plurality of devices which store the same data which is the subject of the query. For example, a query may be allowed to be of the form "Does your data include an order for stock symbol X with a quantity of at least Y and a price of at least Z" where Y is a non-trivial quantity (e.g., Y is not 1 share, but is no less than 10,000 shares) and Z is "close" to the market price (e.g., Z is within one cent of the market price at the time of the query).

In an embodiment where some but not all data (e.g., some but not all order data) is made available to be the subject of queries (e.g., some order data is encrypted and on the server of the entity, other data is not on the server of the entity though it may be reflected in the OMS), the answer to a query (e.g., whether a "NO" is the answer to the query) is not necessarily indicative of the answer, if such a query were posed to the entirety of the data (e.g., on the entirety of the data in the OMS).

Queries regarding encrypted information may be generated and/or provided by a server (e.g., a single server in communication with each of a plurality of servers of entities), and answers to such queries may be received and aggregated by that server. For example, in an embodiment where each of a plurality of servers stores the order data of a respective entity (e.g., a buy-side participant), a single server may be in communication with the servers of those entity. Thus, the single server is able to access (e.g., through decrypting, through posing queries) the order data of each such entity. Such a server can serve as an intermediary to allow any of a plurality of entities to pose queries of any other entity (e.g., to permit orders to be matched). In another embodiment, any of a plurality of entities may pose a query of any other entity directly, as in a peer-to-peer configuration.

X. RULES

Rules, in whole or in part, may be defined, transmitted and/or stored according to various formats, such as that specified by FIX format. FIX is generally an industry standard protocol used for various information. Rules may be stored on the workstation (e.g., of a buy side participant), stored by another device accessible to a buy side participant or a sell side participant and/or communicated to and stored by the server.

Certain rules may define which orders are of interest. Such rules may define that, to be considered of interest, an order must possess certain features, such as an order:

For a particular security or set of securities (e.g., defined by symbol, market sector, market cap), With a certain price/range of prices, From a certain source (e.g., from a certain entity, from a certain type of entity, from a certain trader, from a certain trading desk), With a certain volume/range of volumes, For a buy or for a sell, and/or Historical data of an entity (e.g., trades by that entity, certain securities/sets of securities the entity is active in, volume of trading of an entity).

Rules can define parameters which an order must possess. Such parameters may be absolute, or relative to some other data such as historical criteria.

Certain rules may define which orders meet various types of quality criteria.

For example, an entity (e.g., a buy side participant) can receive an alert when the price of an order for Microsoft stock is between 25 and 26, and the volume of the order is greater than a threshold.

Rules define various criteria which information from various entities can satisfy. For example, a rule can define, one or more financial instruments (e.g., a specific security), a price or other value measurement of the financial instrument (e.g., a price of a security, a range of prices of a security, a yield of a fixed income security, a set of prices of a security, a yield of a fixed income security, a range of yields of a fixed income security, a set of yields of a fixed income security).

Further criteria may be associated with an order, in which the criteria define the substitutability of a specified security for one or more other securities. Such criteria can increase the "match" rate of bids and offers, and can facilitate trades, because acceptable substitutions in the specified equity may be readily made.

Rules may be stored such that different rules may be easily retrieved and modified by, e.g., different brokers. Such a feature allows individuals to easily receive alerts which are of interest. A group of rules may be "bundled" and offered as a set to individuals, facilitating adoption by certain individuals with certain common criteria.

XI. RULES TRIGGERED

Alerts

Rules, when satisfied, can result taking any of the following actions:

an alert (e.g., notification that an order exists, a notification of some parameters of an order that exists), a trade (e.g., automatically execute a trade by matching the order, ask one or both parties whether they want to execute a trade by matching the order), initiating, or helping to initiate, a communication between entities (e.g., between a buy side participant and a sell side participant), and/or putting the order that satisfies the rule to a market (e.g., make the order susceptible to being accepted by a counter-party).

The specification of a rule (e.g., rule parameters) and/or the specification of actions to take when a rule is satisfied may be specified by the user or on behalf of the user. For example, a user interface may be operable by the user (or by another) to allow the user to select (1) any of a plurality of parameters for a rule (e.g., types of equities, quantity), and/or (2) types of actions to take (e.g., initiate a phone call, automatically execute an order, suspend an order). Alternatively, the user may always be presented with a set of actions he may take at the appropriate moment, and given the opportunity to select the action(s) he desires.

For example, when a rule is satisfied, an alert can be displayed (e.g., to a buy-side participant via a workstation of that entity) in which the alert includes a button. When the button is pressed, a message is sent to another party (e.g., a trader at the sell side participant which originated the data that satisfies the rule). This message informs the other party to call (e.g., the buy side participant). A phone number or other means of contacting may be provided in the message, possibly with instructions (e.g., "Call John Smith at 555-555-5555"). In an embodiment, contact may be initiated (either automatically or upon the request of the alert recipient) by the workstation dialing or causing to be dialed a phone number (e.g., via a phone interface, via a VoIP connection) to connect two or more parties (e.g., connect a client and a sales trader).

The message could indicate that there is a potential buyer or potential seller, or the message could indicate that an entity is "involved" in the equity. The identity of the entity may be disclosed, or the entity could remain anonymous at this stage.

Information may be displayed or otherwise output (e.g., to just the sales trader, to both parties on a phone call or a potential phone call), and such information can describe (1) the reason the alert was generated (e.g., the corresponding rule that was satisfied, the order or orders which caused the rule to be satisfied), (2) the order the other entity has (e.g., the entity which posed the query).

At any time (e.g., after the client speaks with the sales trader), the alert can be dismissed (e.g., a dialog box which presents the alert can be closed by the client) or the order can be sent to the sales trader (e.g., by the client clicking on an "ORDER" button in the alert dialog box).

If the order is sent, then the order that the client is working may be sent to the sales trader. The client may first amend the size of the order before sending the order. Such a size amendment may be (e.g., upon a single click) set to be the size of the entire order in the client's OMS.

In an embodiment, if a sell side entity receives a large enough order (e.g., volume exceeding a threshold such as "sell 50,000 Microsoft"), then the order is received, directly or indirectly, by the server (e.g., from an OMS of an entity). The receipt of such an order by the server can result in, among other things, various rules of various entities (e.g., buy side entities) being triggered. For example, the order received by the server can satisfy the rules of one or more particular buy side entities, and thus an alert is generated and displayed to the buy side entity or entities (e.g., at one or more workstations associated with the buy side entity).

Processing and actions can be based on the category of order data. For example, where there is a potential (not actual) order (e.g., a potential buy order for a particular equity, which possibly does not specify a quantity or price) that a first entity defines (e.g., by entering the parameters of the potential order via a graphical user interface), and where e.g., a second entity has a complementary order (e.g., a sell order for the same equity), a particular type of alert (e.g., a particular message and set of further processing) may be invoked (e.g., an indication that the first entity has a potential, not actual, order). Processing can be specific to, e.g., a match for a potential order (e.g., particular steps to perform by one or both entities). For example, the second entity may receive an alert that allows him to contact the first entity. Processing can be specific to, e.g., the type of entity that submits the order that triggers the rule. For example, when an alert is to be displayed, in an embodiment alerts can be displayed to the buy side participant and not to sell side participant(s) involved in the potential transaction.

Various steps that may be performed in a match for an order include any of the steps described herein.

XII. OBJECTIVE AND SHARED RULES

Of the rules that define when information (e.g., certain sell side orders) is made available to, or otherwise used in making information available to, an entity (e.g., a buy side participant) certain rules may be pre-established, and of applicability to all entities.

In an embodiment, such pre-established rules, are designed to be (i) resistant to manipulation (e.g., by a sell-side participant) and/or (ii) unambiguous and therefore not open to interpretation (e.g., by a sell-side participant). Such rules may be pre-established by a group of the entities (e.g., by agreement of the entities).

Such objective rules can apply to several entities (e.g., several or all brokers and/or several or all customers of brokers) simultaneously.

The objective rules can assign different 'value' to different types of data based on, e.g., likelihood that a trade will result from such data. For example, in order of most likely to last likely is the following information, which can be codified in one or more objective rules shared by all entities: an entity is working an order, an entity traded a relatively large volume (e.g., above a threshold) of a security this day, an entity traded a relatively large volume of a security in the recent past, an entity claims to be "in touch".

Many other types of information may be assessed in such objective rules. For example, one type of information is the identity of the entity from which the information originates. Thus, information that originates from certain entities (e.g., from the OMS of that entity) can be deemed to be more likely to result in a trade than information that originates from certain entities. For example, an indication of interest from a large buy side participant (e.g., any of a particular set of entities) may be deemed to be more likely to result in a trade than an indication of interest from a small buy side participant.

The objective standard and definitions can define the level and quality of indication of interests. Objective standard can determine that an entity has activity in a stock.

In various embodiments, it can be advantageous to impede or prevent an entity's ability to falsify an intent to trade. Accordingly, integrity can be assured or improved by auditing of entity's practices, and/or requiring a portion of the entities orders to be exposed to automatic electronic trades.

An entity can employ the objective criteria, and further narrow it or customize it if desired. However, the use of the objective criteria may be made with the above-described and other readily apparent benefits.

XIII. RATINGS

In various embodiments, it can be advantageous to provide a rating of one or more entities (e.g., each entity has a rating). Such a rating of an entity may be made available to that entity, to other entities and/or to others. For example, it can be advantageous in various embodiments to provide a rating of an entity to all others that may desire to transact with that entity. For example, when an alert is displayed that an order exists in the OMS of a particular entity, the alert may also display a rating of that entity.

A rating of an entity may be determined from factual information (e.g., based on whether a trade ensued from information provided from the entity) and/or subjective (based on another entity's rating of that entity).

A rating of an entity may comprise one of a set of enumerated choices (e.g., good, bad, neutral). A rating may comprise a numerical value (e.g., the percent of times a trade ensued with the entity). Another numerical rating may include a plurality of numbers, such as the number of opportunities to trade of the entity (e.g., the number of times a client responded to an alert caused by the entity's input such as an indication of interest) and the number of actual trades of the entity (e.g., actual trades that resulted from such responses to such alerts).

A rating can be selectively displayable based on various factors. For example, a "negative" rating might only be displayed after a threshold is attained (e.g., only after ten consecutive negative ratings).

A rating can be selectively changed or improved, such as by eliminating previous negative ratings. For example, after four consecutive "positive" ratings, previous negative ratings can be erased.

XIV. ACTIONS BASED ON PREVIOUS ORDERS

According to an embodiment, any action, calculation or determination described herein can be based on previous orders, such as orders that are no longer in the OMS of a participant. For example, an OMS of a participant may store a particular order but then for various reasons (e.g., there is no longer any interest in working the order) the order is removed from the OMS. Further, certain previous orders may be determined (with full or partial accuracy or confidence) to have been removed for reasons other than being matched and executed. For example, if no trade is known to have been executed through the system on a particular order, but that order was removed (e.g., by the participant) or is otherwise rendered unavailable, then that previous order can be considered, in an embodiment, to have been removed for reasons other than being matched and executed.

In an embodiment, such previous orders may be used to trigger alerts, which are described herein. Such an embodiment can be advantageous in certain embodiments because, among other things, data regarding unexecuted previous orders may indicate, e.g., that the order "exists" and the participant would still be willing to execute that order.

For example, information regarding certain previous orders (e.g., unexecuted orders) can "match" certain rules and trigger, e.g., an alert order that indicates another participant has an order that could be considered to match the previous order. Such an alert can be displayed to the participant from which the previous order originated (e.g., in the OMS of the previous participant). Similarly, such an alert can be displayed to the participant from which originated the order that the previous order matches (e.g., in the OMS of the previous participant).

In an embodiment, various criteria can be used to determine whether a previous order is available for matching with other orders. For example, in an embodiment the volume of an unmatched order must exceed a threshold in order for that unmatched order to be considered available for matching with others. In an embodiment, the time since the unmatched order was "pulled down" (e.g., since it was removed from the OMS or otherwise made unavailable) must be less than a threshold in order for that unmatched order to be considered available for matching with others.

In an embodiment, a user can search for various unmatched orders of others, e.g., to find unmatched orders of possible interest to him. Similarly, a user with unmatched orders may set criteria for when to allow others to find information on those unmatched orders (when to make his unmatched orders available to others). For example, a user may set that all unmatched orders are made available, all unmatched orders that have greater than a threshold quantity, all unmatched orders that have that are affirmatively selected or otherwise indicated by the user or by another, all unmatched orders that have were made unavailable within a certain time period (e.g., no more than one day old, no less than two days old).

What is claimed is:

1. An apparatus comprising:
   a first computing device configured as an electronic trading system configured to:
   determine that an order from a first participant of a plurality of participants meets criteria of a rule shared among the plurality of participants of the electronic trading system,
   in response to determining that the order meets the criteria of the rule, transmitting an encrypted query indicating at least one security and at least one price defining the order to an order management system of a second participant of the plurality of participants,
   receive a response to the encrypted query, and
   in response to receiving the response, facilitate a trade fulfilling the order and a matching order;
   and the order management system of the second participant, which is configured to:
   receive the encrypted query;
   determine that the encrypted query corresponds to the matching order in an encrypted data set that represents trading interests of the second participant; and
   transmit the response to the encrypted query to the electronic trading system, in which the response indicates that the encrypted query corresponds to the matching order in the encrypted data set.

2. The apparatus of claim 1, in which the criteria of the rule relates to a prior order related to the first participant.

3. The apparatus of claim 1, in which the order management system is configured to:
   store information representing a plurality of orders of the second participant in the encrypted data set;
   determine that the encrypted query satisfies a rule specifying that the trade fulfilling the matching order should be executed; and in which transmitting the response includes transmitting the response in response to the determination that the encrypted query satisfies the rule.

4. The apparatus of claim 1, in which the order management system is configured to: receive order data and encrypt the order data to make the encrypted data set.

5. The apparatus of claim 1, in which the order management system is configured to: generate a message that the encrypted query corresponds to the matching order in the encrypted data set.

6. The apparatus of claim 5, in which the order management system is configured to transmit the generated message to a predetermined recipient.

7. The apparatus of claim 1, in which the rule identifies whether a the first participant has traded above a threshold amount of a financial instrument in a time period.

8. The apparatus of claim 1, in which the rule identifies whether the first participant is a proper type to originate the order.

9. The apparatus of claim 8, in which the proper type includes a large buy-side participant.

10. The apparatus of claim 1, in which the electronic trading system is configured to provide a rating of the first participant to the second participant.

11. The apparatus of claim 10, in which the rating is based on prior activity of the first participant.

12. The apparatus of claim 1, in which the criteria relates to a prior order related to the first participant, in which the rule identifies whether a the first participant has traded above a threshold amount of a financial instrument in a time period, in which the rule identifies whether the first participant is a proper type to originate the order, in which the proper type includes a large buy-side participant;
   in which the order management system is configured to:
      store information representing a plurality of orders of the second participant in the encrypted data set;
      determine that the encrypted query satisfies a rule specifying that the trade fulfilling the matching order should be executed; and in which transmitting the response includes transmitting the response in response to the determination that the encrypted query satisfies the rule;
      receive order data and encrypt the order data to make the encrypted data set;
      generate a message that the encrypted query corresponds to the matching order in the encrypted data set;
      transmit the generated message to a predetermined recipient;
   in which the electronic trading system is configured to provide a rating of the first participant to the second participant, and in which the rating is based on prior activity of the first participant.

* * * * *